United States Patent Office 3,294,563
Patented Dec. 27, 1966

3,294,563
SILICATE GROUT
David Rowland Williams, High Town, near Liverpool, England, assignor to The Cementation Company Limited, London, England, a British company
No Drawing. Filed Mar. 4, 1965, Ser. No. 437,263
Claims priority, application Great Britain, Oct. 22, 1962, 39,966/62
15 Claims. (Cl. 106—74)

This is a continuation-in-part of application Serial No. 316,526 filed October 16, 1963.

The present invention relates to grouting compositions suitable for injection into interstices or fissures in earth formations including soil and rock masses in order to decrease the water permeability thereof and seal the formations.

The utilization of grout composed of an aqueous solution of sodium silicate and an acid, acid salt or a substance which can be hydrolysed to form an acid and injected into an earth formation for the purposes aforesaid is well known.

In these prior art grouting compositions the solution of alkali metal silicate is converted into a polysilicic acid gel by adjusting the pH of the solution so that it lies within certain restricted ranges. Examples of acids, acid salts and substances which can be hydrolysed to form an acid are hydrochloric acid, sodium bicarbonate and ethyl acetate. The grout formed from these known compositions consists essentially of a hydrogel formed from polymerised silicic acid. The time of gelation is determined by the pH of the composition which is determined by concentration of the ingredients and by the specific nature of the acid or acid salt. The set silicate grout varies in consistency from a weak, highly deformable gel to a hard and rigid solid. It is found that gels formed from low concentration and, therefore, fluid mixes dissolve under continued leaching action whereas gels formed from more highly concentrated and, therefore, more viscous mixes shrink excessively, such shrinkage continuing for days and sometimes months after gelation and in extreme cases leading to disintegration of the gel.

It is an object of the present invention to provide a grouting composition which, when first prepared, is extremely fluid and yet when set is particularly resistant to leaching by water.

As above mentioned, it is well known that simple polysilicic acid gels formed by the acidification of dilute silicate solutions are unstable and slowly dissolve in water. (See for example the paper by C. Caron and H. Cambefort, Proc. 4th Int. Conf. Soil Mech. and Foundation Eng. Paper 1a/4.)

Addition of metal salt solutions to sodium silicate solutions gives rise to the corresponding metal silicates which are insoluble. However, the reaction between the silicate and the metal salt is virtually instantaneous under the conditions of silicate grout compositions, and the product is a precipitate rather than a gel. The use of metal silicates for soil treatment has hitherto been mainly confined to the use of two-shot processes in which the sodium silicate and the metal salt solutions are injected into the ground in succession. This two-step injection does not reduce the permeability of the ground to a sufficient extent for most sealing purposes and often results in non-homogeneity of the grout, non-uniform treatment of the earth formation, and lack of control over completeness of the reaction or over the promotion of the desired reaction among competing reactions.

Another object of the present invention is the provision of grouting compositions which may be injected in a single injection step into a soil or rock mass.

It is another object of the present invention to provide a method of sealing an earth formation.

The foregoing objects of the invention as well as other objects and the principles and scope of applicability of the present invention will become more clearly apparent during the course of the following detailed discussion and the appended examples.

It is an important principle according to the present invention that if a metal complex is incorporated in a silicate grout in the manner disclosed herein, a single-shot grout is obtained which sets to a polysilicic acid gel due to the pH value of the grout. The metal ions, which are released from the complex, react with the polysilicic acid gel to give an insoluble product which is thus technically superior to the conventional polysilicic acid gels.

Adhesive compositions including an alkali metal silicate and a complex compound of a metal and an acid are known in the prior art, for instance in the United States Patent to Freyhold No. 2,827,384 which discloses waterproof silicate compositions for coatings and adhesives. These compositions are fundamentally different from those produced in situ in soil and rock masses according to the present invention for the reasons now set forth.

It is well known that adhesives based on sodium silicate set as a result of a decrease of the water content of the system, the decrease being achieved by evaporation, by heating, or by absorption of water into the material being coated or bonded, or by some combination of these effects. In formulating adhesives the properties of the particular alkali metal silicate used are fairly critical. For solutions of a silicate of given oxide to silicate ratio, the viscosity increases gradually with increasing solids content, until a point is reached beyond which the viscosity rises steeply for small increases in concentration. Silicate adhesives are generally formulated having overall silicate concentrations in this region since the loss of a few percent of moisture is sufficient to transform the material from a freely flowing liquid into a solid.

The silicate compositions disclosed in the above-mentioned Freyhold patent are of this type and have silica ($SiO_2$) concentrations of the order of 35% w./v.

In practice the materials to be bonded (e.g., paper) are coated with the adhesive composition and are then brought together under a light pressure. Water from the adhesive is absorbed by the materials, giving rise to initial set. The adhesive is finally set by heating over heated rollers (Freyhold patent, col. 2, l. 45).

Because of the highly alkaline character of the adhesive composition it is highly unlikely that polysilicic acid would be formed under such conditions, and therefore the final product would be a dehydrated sodium silicate, which is slowly soluble, thus making the bond unstable to water.

The Freyhold patent discloses that the addition of an aluminium complex to a conventional silicate adhesive of the type described above renders it insoluble.

The compositions of the present invention as described herein differ from the adhesive compositions just mentioned in several respects. Most important of these differences is that polysilicic acid gel is produced by reducing the pH of a sodium silicate solution to give the corresponding silicic acid which subsequently polymerises. The setting process is therefore the result of a chemical reaction rather than a physical dehydration of the system. The setting of a polysilicic acid gel does not involve overall dehydration of the system and proceeds at ordinary temperatures, external heating being unnecessary.

As a consequence the narrow range of silicate compositions which are applicable for adhesive compositions do not necessarily apply for grouting compositions. In fact the high silica concentrations which are used for adhesives are undesirable in the case of grouts since they give rise to high viscosities, which reduce the ease of injection of the grout into the ground. The 0.5 to 6.0% w./v. of silica concentration range of the grouting compositions disclosed herein gives rise to initial viscosities of the prepared grout in the range 1.1 to 1.6 cp. at 20° C. as opposed to those of the adhesive compositions described in the Freyhold patent which have initial viscosities in the range 0.5 to 1,000 poise.

The instability of conventional polysilicic acid gels is not the result of straightforward dissolution of the material but stems from the depolymerisation of the insoluble polysilicic acid to give smaller units of increased solubility, which are removed from the gel under leaching conditions.

According to one aspect of the present invention there is provided a grouting composition having a pH in the range of from 4 to 11 and formed by the addition of an alkali metal silicate to an aqueous system comprising a metal complex formed from a metal ion of any one of those metals which are capable of forming hydroxylated metal ions in the pH range of from 4 to 11 and a sequestering agent which reacts with the metal ion to give a soluble metal complex, the amount of alkali metal silicate present in the composition being equivalent to at least 0.5% by weight of $SiO_2$ and not more than 6% of $SiO_2$, the silica to oxide ratio of said alkali metal silicate being less than 4, the amount of metal complex present in the composition being such that the molar ratio of metal ion to silica is in the range 0.05 to 0.5, and the metal complex being such that on the addition of the alkali metal silicate to the aqueous system the metal complex decomposes to release hydroxylated metal ions at a rate which is not greater than that at which polysilicic acid is formed but which is high enough to allow at least 80% of the metal ions to be released within one week.

The invention also provides a method of sealing an earth formation, which method comprises the steps of (a) forming a grouting composition having a pH in the range of from 4 to 11 by adding an alkali metal silicate to an aqueous system comprising a metal complex formed from a metal ion of any of those metals which are capable of forming hydroxylated metal ions at a pH in the range of from 4 to 11 and a sequestering agent which reacts with the metal ion to give a soluble metal complex, the amount of alkali metal silicate present in the composition being equivalent to at least 0.5% by weight of $SiO_2$ and not more than 6% by weight of $SiO_2$, the silica to oxide ratio of said alkali metal silicate being less than 4, the amount of metal complex present in the composition being such that the molar ratio of metal ion to silica is in the range 0.05 to 0.5, and the metal complex being such that on the addition of the alkali metal silicate to the aqueous system the metal complex decomposes to release hydroxylated metal ions at a rate which is not greater than that at which polysilicic acid is formed but which is high enough to allow at least 80% of the metal ions to be released within one week, and (b) injecting said composition before the gelation thereof into the earth formation.

The incorporation of a metal complex in a polysilicic acid gel, observing the conditions set forth herein, leads to the production of an insoluble material. The concentrations of the metal complex, and a pH adjusting component if used, are such that when the alkali metal silicate is added to them to form the grouting composition the pH of the resulting mixture lies within the desired range, and is such as to give the required gel time. Under these conditions the alkali metal silicate is converted immediately to low molecular weight silicic acids. These progressively condense with each other to form polysilicic acid chains; the rate of condensation depends upon the pH of the solution, and the silica concentration. Ultimately, the chains are sufficiently extended to form a continuous structure and the composition gels.

By a separate mechanism, the metal complex releases hydroxylated metal ions which react with the free silanol groups of the polysilicic acid, thus protecting it from hydrolytic attack.

If the metal ions were to be released from the complex at a rate which is greater than that at which polysilicic acid is formed then clearly there would be an excess of free metal ions in the system. As a consequence a metal silicate precipitate would be formed rather than a polysilicic acid gel. The formation of a precipitate in the grout would impair the injection characteristics of the grout, since the particulate material would block off the finer pores of the soil, thus reducing the ease of injection. Also the treatment would not be as effective in reducing the permeability of a formation since a particulate suspension is not such a good void-filling material as a silicate gel. At the other end of the scale, if the metal ions were not released sufficiently fast from the complex to react with the polysilicic acid there is the possibility that the metal complex could be leached from the set gel in the ground before the metal has reacted entirely or in part with the polysilicic acid. Accordingly, it should be appreciated that the limit which has been imposed, viz. that at least 80% of the metal ions to be released within one week, is the result of practical rather than theoretical considerations.

Generally, the alkali metal silicate will be added to the other components of the composition as an aqueous solution. It is for this reason that the silica:oxide ratio of the silicate must be less than 4 since silicates having higher ratios are not significantly soluble. (See Iler, "The Colloid Chemistry of Silica and Silicates," Cornell University Press, 1955, p. 19.) It has been determined that practical numerical limits for the range of this ratio are 2.0:1 to 3.8:1 although, unlike the case of the silicate adhesive compositions the silica:oxide ratio is not ratio is not a critical factor in determining the effectiveness of the dilute composition used for grouting. Thus solutions of sodium silicate, with varying silica:oxide ratios, gel to give similar products, providing that the overall silica concentration and the pH of the solution are the same in each case.

The gel time of the composition is determined by its pH value and when the nature of the metal complex and the alkali metal silicate are such that the pH of the resulting composition does not give rise to useful gel times, then it is desirable to arrange for the final composition to have a suitable pH by incorporating in the aqueous system a pH-adjusting component. The pH-adjusting component may be an acid, an alkali, a salt or a substance which can be hydrolysed to give an acid, the particular compound used depending on the desired pH of the composition. It should be noted, however, that the pH adjusting component must not affect the ability of the metal complex to release hydroxylated metal ions in the manner as described above.

The alkali metal silicate used will normally be sodium silicate or, less frequently, potassium silicate.

The sequestering agent is advantageously a compound selected from di- and tri-carboxylic acids, hydroxy carboxylic acids, hydroxy lactones, arsenates and polyphosphates, or water soluble salts thereof. Preferably, the sequestering agent is one or more of the following compounds or, where appropriate, a water-soluble salt thereof: oxalic acid, malonic acid, succinic acid, adipic acid, citric acid, tartaric acid, gluconic acid, glyceric acid, glycolic acid, hydroxy-butyric acid, lactic acid, malic acid, salicylic acid, heptonolactone, sodium arsenate and sodium polyphosphates.

The metals which are capable of forming hydroxylated metal ions in the pH range 4 to 11 include barium, magneisum, calcium, strontium, aluminium, titanium, thorium, zirconium, chromium, molybdenum, manganese, iron, nickel, tin, lead, copper and zinc. Thus the metal complex may be formed in situ by admixing a metal salt, such as aluminium chloride, or a substance such as sodium aluminate, and a sequestering agent, such as oxalic acid or citric acid. It will be appreciated that each metal is not hydroxylated over the full pH range and that a person skilled in the art will select a metal suitable for use at the pH of any particular aqueous system.

In practice it is not possible to define numerical limits for the sequestering agent/metal ratio since for each metal-sequestering agent combination the range of ratios which are suitable will be different, depending on the structures of the particular metal complexes formed and on their relative stability constants. This ratio is determinable empirically in each instance guided by the examples hereinafter wherein the combinations employed release hydroxylated metal ions at the appropriate rate (at least 80% within one week) upon the addition of alkali metal silicate to the system.

The pH-adjusting component, if used, may be for example, hydrochloric acid, sodium bicarbonate, sodium hydroxide or ethyl acetate.

In order to prepare the grouting composition of the invention, one grout component is preferably prepared in a suitable container by mixing together a metal salt, a sequestering agent and, if necessary, a pH adjusting component with one half of the total quantity of water to be employed in the composition. An alkali metal silicate dissolved in the remainder of the water and constituting the second grout component is then added to the first component accompanied by violent agitation of the mixture throughout the addition. The mixed grout is then pumped through an injection rod or the like into the soil or rock mass to be treated.

The invention will be further illustrated by the following examples.

Example 1

60 ml. of a 1.8% w./v. aqueous solution of oxalic acid. $2H_2O$ and 32.4 ml. of a 3.02% w./v. aqueous solution of aluminium chloride $6H_2O$ were mixed together to form an aqueous system containing sequestered aluminium ions. To this aqueous system there were added 7.6 ml. of a sodium silicate solution having a specific gravity of 1.38, the mol. ratio $SiO_2:Na_2O$ being 3.3. The resulting grouting composition had a pH of 6.5 and a gel time of 16 minutes.

Example 2

35.0 ml. of a 5.3% w./v. aqueous solution of citric acid were mixed with 10.0 ml. of a 4.0% w./v. solution of sodium aluminate and the mixture made up to 92.4 ml. with water. To the resulting aqueous system there were added 7.6 ml. of a sodium silicate solution similar to that used in Example 1. The grouting composition thus obtained had a pH of 6.9 and a gel time of 7 minutes.

Example 3

10 ml. of a 48% w./v. solution of aluminium chloride. $6H_2O$, 20 ml. of a 21% w./v. solution of citric acid and 30 ml. of an 8% solution of sodium hydroxide were mixed together and then water was added to make the system up to 92.4 ml. To the resulting aqueous system there were added 7.6 ml. of a sodium silicate solution similar to that used in Example 1. The grouting composition thus obtained had a pH of 6.2 and a gel time of 60 minutes.

Example 4

16.0 ml. of a 6.0% w./v. solution of aluminium chloride, 12.0 ml. of a 6.0% w./v. solution of oxalic acid and water to make the resulting system up to 88.9 ml. were mixed together. To the aqueous system thus obtained there were added 11.1 ml. of a sodium silicate solution similar to that used in Example 1. The resulting grouting composition had a pH of 10.5 and a gel time of 10 minutes.

Example 5

13.3 ml. of a 13.5% w./v. solution of ferric chloride hexahydrate, 13.3 ml. of an 8% w./v. solution of sodium salicylate and 8.3 ml. of a 1 N solution of hydrochloric acid were mixed together and then water added to make the system up to 92.4 ml. To the resulting aqueous system there were added 7.6 ml. of a sodium silicate solution similar to that used in Example 1. The grouting composition thus obtained had a pH of 6.0 and a gel time of 15 minutes.

Example 6

10.0 ml. of a 13.5% w./v. solution of ferric chloride hexahydrate, 33.3 ml. of a 10% w./v. solution of sodium tripolyphosphate, 26.6 ml. of a 1 N solution of hydrochloric acid and water to make the resulting system up to 92.4 ml. were mixed together. To the aqueous system thus obtained there were added 7.6 ml. of a sodium silicate solution similar to that used in Example 1. The resulting grouting composition had a pH of 5.9 and a gel time of 16 minutes.

Example 7

15.4 ml. of a 28.8% w./v. solution of zinc sulphate heptahydrate, 15.4 ml. of a 9.0% w./v. solution of lactic acid and 3.0 ml. of a 1 N solution of hydrochloric acid were mixed together and then water was added to make the solution up to 90 ml. To the resulting aqueous system there were added 10.0 ml. of a soduim silicate solution having a silica concentration of 36.3%, the mol. ratio $SiO_2:Na_2O$ being 3.0. The resulting grouting composition had a pH of 6.4 and a gel time of 8 minutes.

Example 8

14.3 ml. of a 24.1% w./v. solution of aluminium chloride hexayhdrate, 15.7 ml. of a 15.0% w./v. solution of tartaric acid and 4 ml. of a 1 N solution of sodium hydroxide were mixed together and then water added to make the solution up to 83 ml. To the resulting aqueous system there were added 17.0 ml. of a sodium silicate solution similar to that used in Example 7. The grouting composition thus obtained had a pH of 4.8 and a gel time of 21 minutes.

Example 9

6.0 ml. of a 24.1% w./v. solution of aluminium chloride hexahydrate and 9.0 ml. of a 12.6% w./v. solution of oxalic acid dihydrate were mixed together and then water was added to make the solution up to 91 ml. To the resulting aqueous system there were added 9.0 ml. of a sodium silicate solution having a silica concentration of 30.3% w./v., the mol. ratio $SiO_2:Na_2O$ being 2.5. The resulting grouting composition had a pH of 6.2 and a gel time of 33 minutes.

Example 10

5.0 ml. of a 27.0% w./v. solution of ferric chloride hexahydrate and 10.0 ml. of a 20.8% w./v. solution of heptonolactone were mixed together and then water was added to make the solution up to 91 ml. To the resulting aqueous system there were added 9.0 ml. of a sodium silicate solution similar to that used in Example 9. The grouting composition thus obtained had a pH of 9.7 and a gel time of 20 minutes.

From the foregoing discussion and examples it should now be apparent that the compositions and method disclosed herein accomplish each of the invention's objects in an efficient manner and clearly illustrate the principles of the invention.

I claim:

1. A grouting composition having a pH in the range of from 4 to 11 and formed by the addition of an alkali metal silicate to an aqueous system consisting essentially of a metal complex formed from a metal ion of any one of those metals which are able to form hydroxylated metal ions in the pH range of from 4 to 11 and a sequestering agent which reacts with the metal ion to give a soluble metal complex, the amount of alkali metal silicate present in the composition being equivalent to at least 0.5% by weight of $SiO_2$ and not more than 6% by weight of $SiO_2$, the silica to oxide ratio of said alkali metal silicate being less than 4, the amount of metal complex present in the composition being such that the molar ratio of metal ion to silica is in the range 0.05 to 5, and the metal complex being such that on the addition of the alkali metal silicate to the aqueous system the metal complex decomposes to release the hydroxylated metal ions at a rate which is not greater than that at which polysilicic acid is formed but which is high enough to allow at least 80% of the metal ions to be released within one week.

2. A grouting composition as claimed in claim 1 wherein the alkali metal silicate is chosen from the group consisting of sodium silicate and potassium silicate.

3. A grouting composition as claimed in claim 1 wherein the alkali metal silicate is added to the aqueous system in the form of an aqueous solution.

4. A grouting composition as claimed in claim 1 wherein said aqueous system further consists essentially of a pH adjusting component.

5. A grouting composition as claimed in claim 1 wherein the metal ion from which the metal complex is formed is chosen from the group of metal ions consisting of barium, magnesium, calcium, strontium, aluminium, titanium, thorium, zirconium, chromium, molybdenum, manganese, iron, nickel, tin, lead, copper and zinc.

6. A grouting composition as claimed in claim 1 wherein the sequestering agent from which the metal complex is formed is chosen from the group consisting of a di-carboxylic acid, a tri-carboxylic acid, an hydroxy carboxylic acid, an hydroxylactone, an arsenate and a polyphosphate.

7. A grouting composition as claimed in claim 6, wherein the sequestering agent is chosen from the group consisting of oxalic acid, malonic acid, succinic acid, adipic acid, citric acid, tartaric acid, gluconic acid, glyceric acid, glycolic acid, hydroxybutyric acid, lactic acid, malic acid, salicylic acid, heptonolactone, sodium arsenate and a sodium polyphophate.

8. A grouting composition as claimed in claim 1, wherein the metal complex is formed by admixing in aqueous solution aluminium chloride and an acid chosen from the group consisting of oxalic acid and citric acid.

9. A method of sealing an earth formation, which method comprises the steps of (a) forming a grouting composition having a pH in the range of from 4 to 11 by adding an alkali metal silicate to an aqueous system consisting essentially of a metal complex formed from a metal ion of any one of those metals which are capable of forming hydroxylated metal ions at a pH in the range of from 4 to 11 and a sequestering agent which reacts with the metal ion to give a soluble metal complex, the amount of alkali metal silicate present in the composition being equivalent to at least 0.5% by weight of $SiO_2$ and not more than 6% by weight $SiO_2$, the silica to oxide ratio of said alkali metal silicate being less than 4, the amount of metal complex present in the composition being such that the molar ratio of metal ion to silica is in the range 0.05 to 0.5, and the metal complex being such that on the addition of the alkali metal silicate to the aqueous system the metal complex decomposes to release hydroxylated metal ions at a rate which is not greater than that at which polysilicic acid is formed but which is high enough to allow at least 80% of the metal ions to be released within one week, and (b) injecting said grouting composition before the gelation thereof into the earth formation.

10. A method of sealing an earth formation according to claim 9, wherein the alkali metal silicate is chosen from the group consisting of sodium silicate and potassium silicate.

11. A method according to claim 9 wherein the alkali metal silicate is added to the aqueous system in the form of an aqueous solution.

12. A method according to claim 9 wherein the metal ion from which the metal complex is formed is chosen from the group of metal ions consisting of barium, magnesium, calcium, strontium, aluminium, titanium, thorium, zirconium, chromium, molybdenum, manganese, iron, nickel, tin, lead, copper and zinc.

13. A method according to claim 9 wherein the sequestering agent from which the metal complex is formed is chosen from the group consisting of a di-carboxylic acid, a tri-carboxylic acid, an hydroxy carboxylic acid, an hydroxy lactone, an arsenate and a polyphosphate.

14. A method according to claim 13 wherein the sequestering agent is chosen from the group consisting of oxalic acid, malonic acid, succinic acid, adipic acid, citric acid, tartaric acid, gluconic acid, glyceric acid, glycolic acid, hydroxybutyric acid, lactic acid, malic acid, salicylic acid, heptonolactone, sodium arsenate and a sodium polyphosphate.

15. A method according to claim 9 wherein the equeous system further comprises a pH-adjusting component.

No references cited.

H. M. McCARTHY, *Acting Primary Examiner.*

S. E. MOTT, *Assistant Examiner.*